(12) United States Patent
van Riel

(10) Patent No.: US 8,312,085 B2
(45) Date of Patent: Nov. 13, 2012

(54) SELF-TUNING STATISTICAL METHOD AND SYSTEM FOR BLOCKING SPAM

(75) Inventor: Henri H. van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 1053 days.

(21) Appl. No.: 10/942,112

(22) Filed: Sep. 16, 2004

(65) Prior Publication Data

US 2006/0075030 A1 Apr. 6, 2006

(51) Int. Cl.
*G06F 15/16* (2006.01)
(52) U.S. Cl. ........................................ 709/206
(58) Field of Classification Search .................... 709/206
See application file for complete search history.

(56) References Cited

U.S. PATENT DOCUMENTS

| | | | |
|---|---|---|---|
| 6,769,016 B2 | 7/2004 | Rothwell et al. | |
| 7,222,158 B2* | 5/2007 | Wexelblat | 709/206 |
| 7,257,564 B2* | 8/2007 | Loughmiller et al. | 706/16 |
| 2003/0009698 A1 | 1/2003 | Lindeman et al. | |
| 2004/0177120 A1* | 9/2004 | Kirsch | 709/206 |
| 2004/0243847 A1 | 12/2004 | Way | |
| 2005/0193076 A1* | 9/2005 | Flury et al. | 709/206 |
| 2005/0262209 A1* | 11/2005 | Yu | 709/206 |
| 2006/0031483 A1* | 2/2006 | Lund et al. | 709/224 |
| 2006/0059238 A1* | 3/2006 | Slater et al. | 709/206 |

OTHER PUBLICATIONS

International Search Report and Written Opinion issued in International Application No. PCT/US05/32819.

* cited by examiner

*Primary Examiner* — Shirley Zhang
(74) *Attorney, Agent, or Firm* — Wilmer Cutler Pickering Hale and Dorr LLP

(57) ABSTRACT

A system is provided for detecting unsolicited bulk email (spam). A list server receives email from various senders as well as queries regarding the senders. A database is used for storing information corresponding to the amount of unsolicited bulk email received at the spamtrap addresses. The list server dynamically makes a determination as to which senders are transmitting a disproportionate amount of email and should be labeled as spammers. The determinations made by the list server are based on the amount of unsolicited bulk email received from senders relative to the total amount of email transmitted by senders.

46 Claims, 4 Drawing Sheets

SELF-TUNING STATISTICAL METHOD AND SYSTEM FOR BLOCKING SPAM

BACKGROUND OF THE INVENTION

1. Technical Field

The present invention relates to electronic mail transmission and, more particularly, to the detection and blocking of unsolicited bulk electronic mail otherwise known as spam.

2. Description of the Related Art

There has been an increasing growth of electronic traffic over the Internet in recent years. As the Internet continues to evolve and traffic continues to grow, various problems begin to surface. One of the most notable problems today is that of unsolicited bulk email, or spam. Spam is generally in the form of marketing information that is transmitted to a large number of users without solicitation. This type of email is often useless to the person receiving it. Nonetheless, a great deal of time is spent by the recipient to open the email and review/delete the message. While it is possible that a small number of recipients may have an actual interest in the email, the vast majority have no interest and tend to delete spam upon receipt. The term spammer is often used to identify a person (or organization) who transmits spam.

One of the primary objections to spam is that it can waste valuable resources without proper authority. For example, spam can take up valuable storage space on an individual's (or company's) email account or mail server. This can often result in a storage quota being exceeded on the user's email account. When this happens, legitimate email can be prevented from reaching the user. For example, most internet service providers (ISP) allocate a certain amount of storage space for each user. Once that storage space is exceeded, email delivery is suspended. All email sent to the user during the suspension period is discarded, or otherwise not accepted by the ISP. Users must delete emails in their accounts in order to receive new emails.

Another problem with receiving spam is that a significant amount of time can be spent reviewing and deleting messages that have been received. Since a recipient may not know immediately whether a message is spam, the contents must be reviewed prior to making a decision to save or delete. Even if the message can be identified as spam from the header information, it must still be deleted by the user.

Certain types of spam can direct users to different web sites where time is ultimately spent reviewing advertising content. For example, a spam email can advertise discounts or sale from a particular merchant. Users must subsequently follow a link to the merchant's website in order to obtain more information. Once at the merchant's website, users are overwhelmed with product information and incentives which lead to surfing the merchant's website. While this does not pose a problem to home users, an employer can lose employee productivity during this time period. Another objection to the receipt of spam is that the messages tend to contain objectionable and/or illegal content such as pornography, illegal activities, financial scams, etc.

There are various methods in place to intercept, or counter, spam being transmitted to individuals. These methods attempt to filter, or block, email messages that are received from sources that have been identified as, and/or associated with, spammers. Email messages can also be blocked based on information contained in the message, such as the subject line. One problem associated with such techniques, however, is the fact that spammers can easily change the source of spam to bypass the filters. Furthermore, spammers continue to improve the content of their spam to make it difficult to filter. For example, some emails cannot be filtered without examining the content of the message, which may raise various legal and privacy issues. It is also difficult to determine exactly when a user (or system) is transmitting too much email to qualify such transmission as spam. Without such a determination, the spam transmitted cannot be filtered.

Some current methods of filtering spam involve manual selection of a threshold to identify a sender as a spammer. Such methods, however, are inefficient and difficult to implement due to the amount of email being transmitted on a daily basis. Furthermore, spammers can easily change the address being used to transmit spam. Consequently, there is a high cost associated with monitoring the level of email being transmitted by users in order to manually establish a threshold for classifying such messages as spam. Additionally, the time required to adjust the threshold may be too long, resulting in spammers changing their addresses prior to being blocked or immediately upon being blocked.

SUMMARY OF THE INVENTION

In accordance with one or more embodiments, the present invention provides an ability to identify unsolicited bulk email wherein a variety of spamtrap addresses are created and dedicated to the receipt of unsolicited bulk email, and spammers are identified based, in part, on the amount of email received at the spamtrap addresses.

In accordance with at least one embodiment of the invention, a system is provided for detecting unsolicited bulk email. The system comprises one or more spamtrap addresses, a list server, and a database. The spamtrap addresses are created to receive unsolicited bulk email, or spam. The list server receives email from a plurality of senders as well as queries regarding the senders. The database is used for storing information corresponding to the amount of unsolicited bulk email received at the spamtrap addresses. Additionally, the database stores query data corresponding to the number of queries received regarding senders of email. Based on the information stored on the database, the list server makes a determination of which senders transmit a disproportionate amount of email and should be labeled as spammers. According to such a system, spammers may be identified in real time. The spam transmitted by these users could be effectively blocked, thereby saving valuable resources.

According to one or more specific implementations of the invention, the information stored on the database can include at least an IP address associated with each of the senders and the number of unsolicited bulk email sent by each sender to the spamtrap addresses. Furthermore, the query data can correspond to the number of inquiries on whether a particular sender has previously been identified with transmission of unsolicited bulk email. The query data can be representative, at least in part, of the total number of emails transmitted by the sender in question. The list server can automatically set a threshold value for determining which senders transmit unsolicited bulk electronic mail. Accordingly, the list server can dynamically adjust the threshold value and identify the addresses of spammers without external intervention. The list server can also make as many adjustments as necessary to compensate for spammers who change their email addresses, or the addresses of their email servers.

According to at least one aspect of the present invention, the database can store timestamps for each unsolicited bulk email received at the spamtrap addresses and each query received. The list server can also apply different weight factors to the stored information and query data based on the timestamp. These weight factors can subsequently be applied when identifying spammers. Various embodiments of the invention can also allow the list server to receive removal requests from senders who have been identified as spammers. The list server can review the removal request to determine if the sender is transmitting spam or legitimate bulk email.

It is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, and various features of novelty which characterize the invention, are pointed out with particularity in the appended claims forming a part of this disclosure. For a better understanding of the invention, its operating advantages and the specific benefits attained by its uses, reference should be had to the accompanying drawings and embodiments of the invention.

DETAILED DESCRIPTION OF THE INVENTION

Reference now will be made in detail to preferred embodiments of the invention. Such embodiments are provided by way of explanation of the invention, which is not intended to be limited thereto. In fact, those of ordinary skill in the art will appreciate, upon reading the present specification and viewing the present drawings, that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 1:
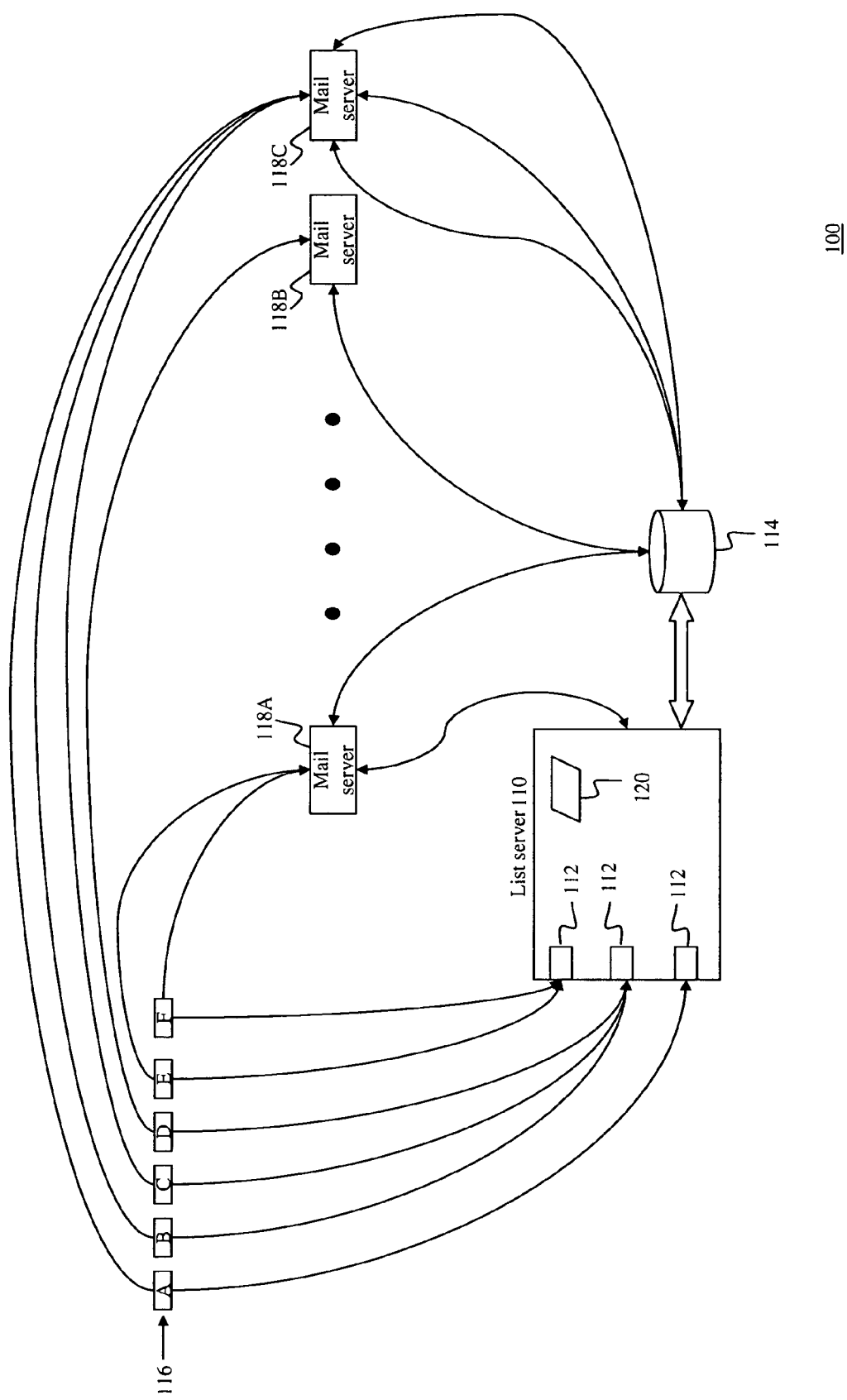
FIG. 1 is a block diagram illustrating a system for detecting unsolicited bulk email in accordance with at least one embodiment of the present invention.

Turning to FIG. 1, a spam detection system 100 is illustrated for detecting unsolicited bulk emails (spam) according to an exemplary embodiment of the present invention. The spam detection system 100 of FIG. 1 includes a list server 110, a database 114, a plurality to senders 116 of email, and a plurality of mail servers 118. The list server 110 is used to receive and detect both regular email and unsolicited bulk email (spam). Accordingly, the list server 110 includes a plurality of spamtrap addresses 112. The spamtrap addresses 112 are not used by senders 116. According to at least one embodiment of the present invention, the spamtrap addresses 112 correspond to email addresses that are monitored only for the receipt of unsolicited bulk email (spam). The list server 110 monitors the amount of spam received at the spamtrap addresses 112 in order to identify senders 116 that transmit spam. According to other embodiments of the invention, the list server 110 can count only emails that are received at more than one spamtrap address 112. Accordingly, if a particular spam message is only received at one spamtrap address 112, it may be discarded for purposes of identifying a sender 116 as a spammer. According to one or more further embodiments of the invention, spam messages are assigned higher weight factors (as will be described in further detail below) if they are received at more than one spamtrap address 112.

Information collected by the list server 110 regarding spam received at the spamtrap addresses 112 can be stored in the database 114. Optionally, one or more embodiments of the present invention can allow the database 114 to be maintained either directly on the list server 110 or remotely from the list server 110. In either event, the list server 110 is in communication with the database 114, at least in part, to enter data and submit queries. Email transmitted by the senders 116 can also pass through one or more mail servers 118. When a mail server 118 receives an email from a sender 116, a query is submitted to the database 114. In the query, the mail server 118 would request information regarding the sender 116 of the email message. For example, the mail server 118 would be interested in determining if the sender 116 has been identified as a spammer (i.e., someone who sends unsolicited bulk emails) so that messages sent by that particular sender could be blocked.

Optionally and additionally, the mail server 118 can identify a sender 116 as a spammer, if the mail server 118 receives too many messages from the sender 116 within a predetermined time frame. Furthermore, the list server 110 can identify a sender 116 as a spammer if it receives too many queries regarding the sender from the mail servers 118. Senders 116 can also be identified as potential spammers if there is a sudden, large change in the amount of email they transmit. For example, consider a sender 116 who has been transmitting approximately 10 emails per day. Suddenly, the sender 116 begins transmitting approximately 10,000 emails per day. Assuming that some of the emails are received at the spamtrap addresses 112, the list server 110 could decide to block emails from the sender 116. Emails can be blocked for a short period of time, a long period of time, or permanently. The list server 110 stores information on the database 114 corresponding to the identification of senders 116 who have been identified as spammers. While the present embodiment of the invention identifies a list server 110 for creating/monitoring the spamtrap addresses 112 and interacting with the database 114, it should be noted that these actions/features can be implemented in the mail server 118 or various types of computer systems. Additionally, a single computer system can be configured to act as both a list server 110 and a mail server 118.

The list server 110 makes a determination as to which senders 116 should be identified as spammers or as senders of legitimate email. According to one or more embodiments of the present invention, solicited bulk email can also be identified as legitimate email. This information can be determined, in part, based on the number of spam email received at the spamtrap addresses 112 and/or the number of queries submitted to the database 114 by the mail servers 118. For example, at least one embodiment of the present invention allows the list server 110 to identify potential spammers based on the relative proportion of spam received at the spamtrap addresses 112 and the number of legitimate email sent to user addresses. Additionally, the list server 110 can keep track of the number of queries submitted to the database 114 by the mail servers 118. The number of queries submitted can, according to certain embodiments of the invention, correspond to the total number of emails transmitted by the senders 116 (including spam) or the number of legitimate emails transmitted by the senders 116. Based on these values, the list server 110 is capable of determining the proportion of spam transmitted by any sender 116 relative to the proportion of legitimate emails.

As senders 116 continue transmitting email to the mail servers 118 and the list server 110, data continues to be collected. The list server 110 automatically (and continuously) calculates various ratios related to the proportion of spam transmitted by various senders 116 relative to the number of legitimate emails transmitted. A threshold value can be calculated, in part, to determine if a sender 116 should be identified as a spammer. If a particular sender 116E, for example, transmits an amount of spam to the spamtrap addresses 112 that exceeds the threshold value set by the list server 110 for all senders 116 of email, then that particular sender 116E would be identified as a spammer. As can be appreciated, the list server 110 continually monitors email traffic and dynamically adjusts the threshold value in order to efficiently identify senders 116 that transmit disproportionate amounts of spam. Once a sender 116E has been identified as a spammer, they are placed on a block list 120, which contains information regarding all senders 116 that have been identified as spammers. The block list 120 can be optionally transmitted to the mail servers 118, in part, to reduce the number of queries submitted to the database 114.

According to one or more embodiments of the present invention, the mail servers 118 can exchange block lists 120 with each other in order to continually update the identification of spammers. This can be beneficial in circumstances where, for example, multiple list servers 110 are established with spamtrap addresses 112 to identify potential spammers. Additionally, this can also be beneficial in situations where the mail servers 118 independently use other methods of identifying spammers. Thus, a mail server 118 with a built in method of identifying spammers would have two sources of information regarding senders 116 who are transmitting spam. Such mail servers 118 can further include algorithms and/or logic to determine which senders should be blocked based on the information contained in both lists. Additionally, one or more embodiments of the invention can provide list servers 110 that transmit information regarding the spamtrap addresses 112 directly to the mail servers 118.

Figure 2:
FIG. 2 illustrates an exemplary database table and block list that can be used with one or more embodiments of the present invention.

Turning now to FIG. 2, an exemplary database table 122 and block list 120 are shown. The database table 122 contains entries (or rows) corresponding to the IP address of senders 116, the number of emails received at the spamtrap addresses 112, the number of database queries regarding the senders 116, and the ratio of spamtrap hits relative to database queries. Additionally, the database table 122 of FIG. 2 includes a column which identifies whether the sender 116 should be listed as a spammer or not. Various threshold values can be calculated in order to determine the relative number of spamtrap hits that should be allowed before a sender 116 is identified as a spammer. For example, according to at least one embodiment of the present invention, the threshold can be calculated based on the sum of database queries relative to the sum of spamtrap hits received from all senders 116 and email servers 118.

According to the example illustrated in FIG. 2, the sum of database queries regarding all senders equals 17,200, while the sum of spamtrap hits equals 41. This results in a ratio of one spamtrap hit per 420 database queries. It can be seen that senders X1 and X5 transmit much more spam to the spamtrap addresses 112 relative to legitimate emails. Thus, they would be identified as spammers. Senders X2, X3, X4, and X6 transmit significantly more legitimate email relative to spam at the spamtrap addresses 112. Therefore, these senders would not be listed as spammers on the block list.

According to at least one alternative embodiment of the present invention, the threshold value can be calculated based on the sum of the ratios of spamtrap hits relative to database queries. Thus, based on the values stored in table 122, the ratio would be 3,860 to 5. This can be reduced to a ratio of 772 database queries per spamtrap hit. Based on this threshold, sender X6 would be identified as a potential spammer. Senders X1 and X5 would also be identified as potential spammers, while senders X2, X3 and X4 would not.

FIG. 2 also illustrates an exemplary block list 120 that can be transmitted to the mail servers 118. The block list 120 can consist of, for example, the IP address of the sender and an indication of whether the sender has been identified as a spammer. Accordingly, the block list 120 can include at least two different options. The first option would correspond to, for example, the situation where the threshold is set based on the sum of the database queries relative to the sum of spamtrap hits (i.e., threshold 1). The second option would be to transmit the block list 120 where the senders 116 are identified as spammers based on the second threshold value (i.e., threshold 2). Alternatively, the list server 110 can transmit a block list 120 that contains both values to the mail servers 118. Furthermore, various other statistical ratios can be calculated in order to set different threshold values and/or make various observations regarding which senders 116 could potentially be sending spam.

At least one further embodiment of the present invention combine the number of spamtrap hits and queries in various proportions to set different threshold value. Multiple list servers 110 could also exchange information regarding senders 116 whose ratios are within a predetermined tolerance of the threshold value. If a sender 116 is identified as a spammer on multiple list servers 110, they can be identified as a spammer on a list server 110 where they have not met the threshold requirements, but have a ratio within the predetermined tolerance.

Additionally, the list server 110 can maintain historical data on senders 116. If a sender's ratio approaches the threshold value, but does not exceed it, historical data regarding that sender 116 would be examined to determine if the sender 116 might be a spammer. The historical data could, under certain circumstances, identify a trend or pattern in the sender email transmissions. For example, consider a sender 116 whose ratio falls within the predetermined tolerance. Review of the sender's historical data indicates that the sender has fluctuated past the threshold value on at least one occasion over the last two weeks. The list server 110 could block the sender 116 even though the ratio does not exceed the threshold value. Furthermore, the list server 110 could optionally decide to block the sender 116 until its ratio is well below the threshold value.

Figure 3:
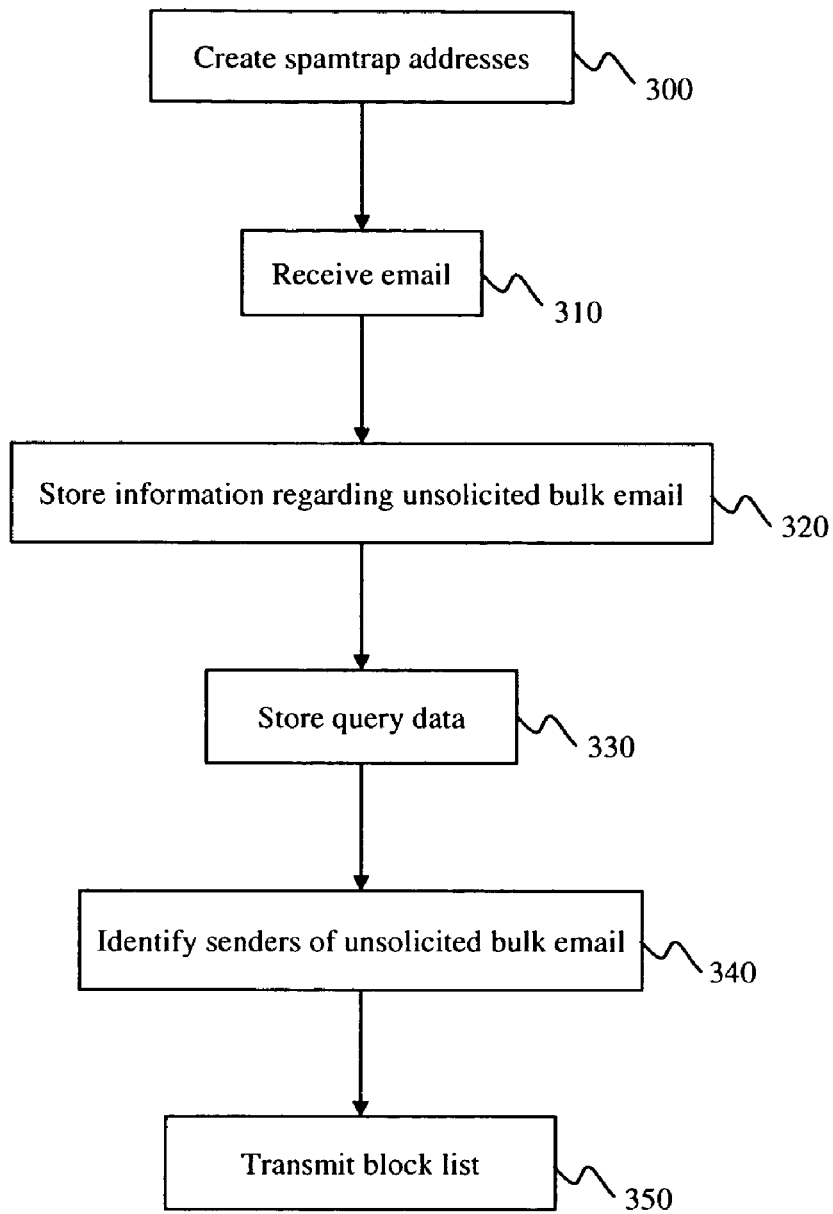
FIG. 3 is a flowchart illustrating steps performed to detect unsolicited bulk email in accordance with various embodiments of the present invention.

FIG. 3 is a flowchart illustrating steps performed in detecting unsolicited bulk email (spam) in accordance with at least one embodiment of the present invention. At step 300, the list server 110 creates one or more spamtrap addresses 112. Optionally, the spamtrap addresses 112 can be created by other entities or on separate mail servers 118 that exchange information, for example, with the list server 110. Additionally, the functions performed by the list server 110 can be implemented on other systems. The specific number of spamtrap addresses 112 created can depend on various factors including, for example, the amount of email traffic passing through the list server 110, the number of queries submitted to the database 114, the number of spam messages received at the spamtrap addresses 112, etc. At step 310, the list server 110 begins receiving emails from various senders 116. At step 320, information regarding unsolicited bulk email (spam) received at the spamtrap addresses is stored, for example, in the database 114. This information can vary depending on the specific embodiment of the invention. For example, the information stored can include the IP address of the sender 116, the return address used by the sender 116, etc. Additionally, the list server 110 could store information specific to the number of spamtrap hits for each sender 116, and/or the number of hits to each individual spamtrap address 112 from each individual sender 116.

At step 330, the list server 110 stores query data to the database 114, or other storage device. The query data can correspond to the number of queries received by the database 114 regarding specific senders 116, the total number of queries received by the database regarding all senders 116, identification information such as an IP address for the sender 116, etc. Both the information regarding the unsolicited bulk email (e.g., spam received at the spamtrap addresses) and the query data are stored in the database 114. As previously discussed, the database 114 can be maintained as a remotely located system or it can be maintained within the list server 110. At step 340, the list server 110 reviews the query data and the information regarding unsolicited bulk email in order to identify senders 116 that should be placed on the block lists 120. For example, the list server 110 may automatically determine criteria wherein the number of emails received at the spamtrap addresses 112 relative to the number queries received regarding senders 116 raises suspicion that a particular sender should be identified as sending unsolicited bulk email. At step 350, a block list 120 containing information regarding senders 116 that have been identified as transmitting unsolicited bulk emails is transmitted to various entities such as, for example, the mail servers 118 or other spam blocking systems. As previously discussed, the function of a list server 110 and mail server 118 can be incorporated into a single computer system. In such situations, the computer system generate a block list 120 that identifies potential spammers, and block email transmissions from such senders 116.

Figure 4:
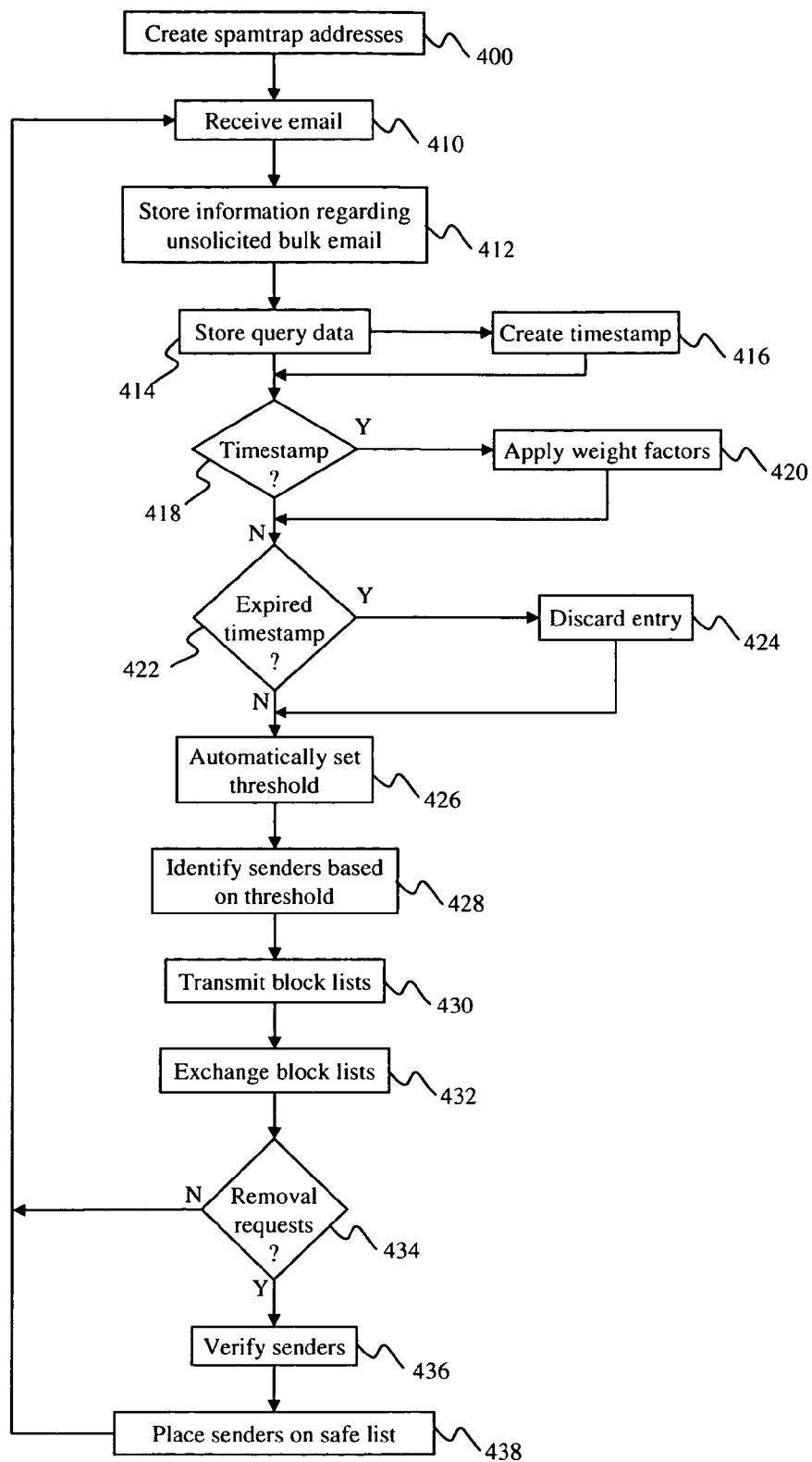
FIG. 4 is a flowchart illustrating steps performed to detect unsolicited bulk email in accordance with at least one alternative embodiment of the present invention.

FIG. 4 is a flowchart illustrating steps performed to detect senders 116 of unsolicited bulk email according to one or more embodiments of the present invention. At step 400, one or more spamtrap addresses 112 are created by the list server 110. As previously discussed, the spamtrap addresses 112 are designed only to receive unsolicited bulk email. There is generally no, or very little, (e.g., less than 95%) legitimate email traffic flowing through these addresses. For example, bounced messages can sometimes reach a spamtrap address 112. A message having a mistyped destination address can sometimes reach a spamtrap address 112. At step 410, the list server 110 begins receiving emails from the senders 116. At step 412, the list server 110 stores information regarding unsolicited bulk email (spam) received at the spamtrap addresses 112. As previously discussed, this information can be stored on the database 114. The information can include, for example, an IP address associated with the different senders 116, the number of unsolicited bulk emails transmitted by the different senders 116, return addresses of the different senders 116, etc. At step 414, the list server 110 stores the query data in the database 114. The query data corresponds, in certain embodiments of the invention, to the total number of emails transmitted by the senders 116 (including spam), or the total number of legitimate emails transmitted by the senders 116.

At step 416, the list server 110 optionally creates timestamps to associate with bulk emails received at the spamtrap addresses 112 and the query data. The timestamp could include, for example, the date and time at which the email was received and/or transmitted. At step 418, it is determined if a timestamp has been created for the query data and the stored information. If a timestamp has been created, then different weight factors can optionally be applied to individual entries. The weight factors could correspond to the stored information and the query data. The weight factors can serve various purposes. For example, according to at least one embodiment of the invention, stored information and query data related to older emails are given a lower weight factor than corresponding information for more recent emails. More particularly, emails that were transmitted, for example, more than two months prior to the current date can be counted with less weight than emails received within the past 24 hour period. This provides flexibility under certain circumstances where new senders 116 must be monitored for transmitting spam. Furthermore, certain embodiments of the invention can cause the weight factor to totally override emails having certain timestamps.

At step 422, it is determined if the timestamp has expired. This corresponds to the situation where information has been weighted to the point that it is too old to be realistically factored into the current processing. If the timestamp has expired, than the entry is discarded at step 424. Otherwise, if the timestamp has not expired, then control passes to step 426 where a threshold is automatically set. As previously discussed, the threshold can be set based on various factors relating to the statistics of emails and spam received by both the email servers 118 and the spamtrap addresses 112. Additionally, various schemes can be employed to set the threshold value.

At step 428, senders 116 that are believed to be transmitting spam are identified. This corresponds to a situation, under certain embodiments of the invention, where the amount of spam relative to legitimate email exceeds a certain value. At step 430, a block list 120 is constructed and transmitted to the mail servers 118. The block list 120 can contain, for example, the IP addresses of senders 116 who have been identified as transmitting a disproportionate amount of unsolicited bulk email relative to legitimate email. The block list 120 can also include query data that assists mail servers 118 with their own screening hardware/software to identify or verify the selection of a particular sender 116 as a spammer. At step 432, the different mail servers can exchange block lists 120 with each other.

At step 434, the list server 110 determines if any removal requests have been received. The removal requests correspond to requests from specific senders to be removed from the one or more block lists 120 because the requesters are transmitting legitimate emails. At step 436, the list server 110 can verify the information submitted by the sender 116 in order to insure that the sender 116 is transmitting legitimate emails from a legitimate email address. Such senders can include, for example, distribution lists that often transmit catalogs, circulars, coupons, etc. to members that subscribe to a particular service.

At step 438, the sender 116, if verified, is placed on a safe list. Once placed on the safe list, the sender 116 could be precluded from being placed on a future block list 120. This can be achieved, for example, by the list server 110 cross referencing the entries on the safe list with entries on newly created block list 120, and removing entries from the block list 120 that correspond to entries on the safe list. At this point, control returns to step 410 where the list server 110 continues receiving email. According to one or more embodiments of the invention, senders 116 who cannot be verified by the list server 110 are only placed on the safe list for a temporary time period until they can be verified. Optionally, such senders 116 could be placed on the safe list until the list server 110 identifies them as exceeding the threshold values based, in part, on emails transmitted to the spamtrap addresses 112. It should be further noted that the process illustrated in FIG. 4 can be continuous and dynamic in various embodiments of the present invention. According to such embodiments, the list server 110 continually receives emails and continually performs the necessary steps to adjust the threshold value based on the current email traffic and identify spammers on an ongoing basis. The list server 110 may perform these functions without any external (or user) intervention.

The spam detection system of the present invention may be implemented in a variety of forms, such as in software or firmware, running on a general purpose computer or a specialized computer system such as, for example, a server. The software can be provided in any machine-readable medium, including magnetic or optical disk, or in memory. Furthermore, the present invention is utilizable in conjunction with a computer system that operates software which may require periodic updates. The spam detection system can be implemented on various computer systems and/or servers using any operating system including, Windows, MacOS, Unix, Linux, etc., and can be implemented using any email system.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of detecting unsolicited bulk email, comprising:
   creating one or more spamtrap addresses for receiving unsolicited bulk email;
   storing information that specifies an amount of unsolicited bulk email received at the one or more spamtrap addresses;
   storing query data that specifies a number of queries received regarding senders of email; and
   identifying at least one sender who transmits a disproportionate amount of unsolicited bulk email by (i) automatically setting a threshold value based on one or more ratios of the stored information and the stored query data, the one or more ratios characterized by a first numerator to denominator relationship, (ii) calculating, for each sender, a ratio of an amount of unsolicited bulk email received at a spamtrap address from that sender to a number of queries regarding that sender, the ratio characterized by a second numerator to denominator relationship, and (iii) comparing the ratio for each sender to the threshold value;
   wherein the first numerator to denominator relationship corresponds to the second numerator to denominator relationship such that the numerator or denominator position of the stored information in the first numerator to denominator relationship is the same as the numerator or denominator position of the amount of unsolicited bulk email at a spamtrap address in the second numerator to denominator relationship.

2. The method of claim 1, wherein storing information further includes:
   storing an IP address associated with each of the different senders; and
   storing the number of unsolicited bulk emails transmitted by each of the different senders to the one or more spamtrap addresses.

3. The method of claim 1, wherein the query data includes a number of inquiries on whether a selected sender has previously been associated with the transmission of unsolicited bulk email.

4. The method of claim 3, wherein the query data is representative of the total number of emails sent by the selected sender.

5. The method of claim 1, further including continuously calculating the one or more ratios of the stored information and the stored query data.

6. The method of claim 1, wherein automatically setting a threshold value includes evaluating data only for senders who have not been identified as sending a disproportionate amount of unsolicited bulk email.

7. The method of claim 1, wherein storing information includes storing a timestamp for each unsolicited bulk email received and for each query received; and applying different weight factors to the stored information and to the query data based on the timestamp.

8. The method of claim 7, wherein unsolicited bulk emails and received queries having recent timestamps are weighted higher than those having older timestamps.

9. The method of claim 7, wherein information regarding unsolicited bulk emails and received queries having timestamps older than a predetermined time period are discarded.

10. The method of claim 1, further comprising transmitting one or more block lists to at least one spam blocking system, wherein the one or more block lists contain information regarding senders who have been identified as transmitting a disproportionate amount of unsolicited bulk email.

11. The method of claim 10, wherein the at least one spam blocking systems exchange the one or more block lists with each other.

12. The method of claim 10, wherein the one or more block lists further contain IP addresses of senders who have been identified as transmitting a disproportionate amount of unsolicited bulk mail.

13. The method of claim 10, wherein the one or more block lists further contain the query data.

14. The method of claim 1, further comprising:
   receiving a removal request from an email sender; and
   if the sender is determined to be a legitimate sender of email, placing the sender submitting the removal request on a safe list containing senders who transmit legitimate email.

15. The method of claim 14, wherein the sender is not determined to be a legitimate sender of email, and further comprising a step of placing the sender on the safe list for a predetermined length of time.

16. A system for detecting unsolicited bulk email comprising:
- one or more spamtrap addresses for receiving unsolicited bulk email;
- a computer-based list server device receiving email from a plurality of senders, and further receiving queries regarding said senders; and
- a hardware-based database device for storing information that specifies an amount of unsolicited bulk email received at said one or more spamtrap addresses, said database device further storing query data that specifies a number of queries received regarding senders of email;
- said computer-based list server device identifying at least one sender who transmits a disproportionate amount of unsolicited bulk email by (i) automatically setting a threshold value based on one or more ratios of the stored information and the stored query data, the one or more ratios characterized by a first numerator to denominator relationship, (ii) calculating, for each sender, a ratio of an amount of unsolicited bulk email received at a spamtrap address from that sender to a number of queries regarding that sender, the ratio characterized by a second numerator to denominator relationship, and (iii) comparing the ratio for each sender to the threshold value;
- wherein the first numerator to denominator relationship corresponds to the second numerator to denominator relationship such that the numerator or denominator position of the stored information in the first numerator to denominator relationship is the same as the numerator or denominator position of the amount of unsolicited bulk email at a spamtrap address in the second numerator to denominator relationship.

17. The system of claim 16, wherein the information stored on said database device comprises at least an IP address associated with each of said senders and the number of unsolicited bulk emails sent by each of said senders to said one or more spamtrap addresses.

18. The system of claim 16, wherein the query data includes a number of inquiries on whether a selected sender has previously been associated with the transmission of unsolicited bulk email.

19. The system of claim 18, wherein said query data is representative of the total number of emails sent by said selected sender.

20. The system of claim 16, further including continuously calculating the one or more ratios of the stored information and the stored query data.

21. The system of claim 16, wherein:
- said database device further stores a timestamp for each unsolicited bulk email received at said spamtrap addresses and each query received; and
- said computer-based list server device applies different weight factors to said stored information and said received queries based on the timestamp when identifying senders who transmit a disproportionate amount of unsolicited bulk email.

22. The system of claim 21, wherein unsolicited bulk emails and received queries having recent timestamps are weighted higher than those having older timestamps.

23. The system of claim 21, wherein said list server discards unsolicited bulk emails and received queries having timestamps older than a predetermined time period.

24. The system of claim 16, further comprising at least one spam blocking system, and wherein said computer-based list server device transmits one or more block lists to said at least one spam blocking system, each said one or more block lists containing information regarding senders who have been identified as transmitting a disproportionate amount of unsolicited bulk mail.

25. The system of claim 24, wherein said at least one spam blocking systems exchange said one or more block lists with each other.

26. The system of claim 24, wherein said one or more block lists contain IP addresses of senders who have been identified as transmitting a disproportionate amount of unsolicited bulk email.

27. The system of claim 24, wherein said one or more block lists contain the query data.

28. The system of claim 16, further comprising one or more email servers, and wherein said one or more mail servers submit queries to said database device to determine which senders transmit a disproportionate amount of unsolicited bulk email based on the information and query data stored in said database device.

29. The system of claim 16, wherein:
- said computer-based list server device evaluates removal requests from senders of email; and
- if a removal request is determined to be legitimate, said computer-based list server device places the sender submitting the removal request on a safe list containing senders who transmit legitimate email.

30. The system of claim 29, wherein:
- a removal request is determined to be a legitimate sender of email; and
- said computer-based list server device places the sender submitting the removal request on said safe list for a predetermined length of time.

31. The system of claim 16, wherein said database device is maintained on said computer-based list server device.

32. A computer program product, residing on a non-transitory computer-readable medium, for use in controlling use of a computer program, said computer program product comprising instructions for causing a computer system to:
- create one or more spamtrap addresses for receiving unsolicited bulk email;
- store information that specifies an amount of unsolicited bulk email received at the one or more spamtrap addresses;
- store query data that specifies a number of queries received regarding senders of email; and
- identify at least one sender who transmits a disproportionate amount of unsolicited bulk email by (i) automatically setting a threshold value based on one or more ratios of the stored information and the stored query data, the one or more ratios characterized by a first numerator to denominator relationship, (ii) calculating, for each sender, a ratio of an amount of unsolicited bulk email received at a spamtrap address from that sender to a number of queries regarding that sender, the ratio characterized by a second numerator to denominator relationship, and (iii) comparing the ratio for each sender to the threshold value;
- wherein the first numerator to denominator relationship corresponds to the second numerator to denominator relationship such that the numerator or denominator position of the stored information in the first numerator to denominator relationship is the same as the numerator or denominator position of the amount of unsolicited bulk email at a spamtrap address in the second numerator to denominator relationship.

33. The computer program product of claim 32, further comprising instructions for causing said computer system to:

store an IP address associated with each of the different senders; and store the number of unsolicited bulk emails transmitted by each of the different senders to the one or more spamtrap addresses.

34. The computer program product of claim 32, wherein the query data includes a number of inquiries on whether a selected sender has previously been associated with the transmission of unsolicited bulk email.

35. The computer program product of claim 34, wherein the query data is representative of the total number of emails sent by the selected sender.

36. The computer program product of claim 32, further including continuously calculating the one or more ratios of the stored information and the stored query data.

37. The computer program product of claim 32, wherein automatically setting a threshold value comprises instructions for causing said computer system to evaluate data only for senders who have not been identified as sending a disproportionate amount of unsolicited bulk email.

38. The computer program product of claim 32, wherein storing information comprises instructions for causing said computer system to:

store a timestamp for each unsolicited bulk email received and for each query received; and apply different weight factors to the stored information and to the query data based on the timestamp.

39. The computer program product of claim 38, wherein unsolicited bulk emails and received queries having recent timestamps are weighted higher than those having older timestamps.

40. The computer program product of claim 38, wherein information regarding unsolicited bulk emails and received queries having timestamps older than a predetermined time period are discarded.

41. The computer program product of claim 32, further comprising instructions for causing said computer system to transmit one or more block lists to at least one spam blocking system, wherein the one or more block lists contain information regarding senders who have been identified as transmitting a disproportionate amount of unsolicited bulk email.

42. The computer program product of claim 41, wherein the at least one spam blocking systems exchange the one or more block lists with each other.

43. The computer program product of claim 41, wherein the one or more block lists further contain IP addresses of senders who have been identified as transmitting a disproportionate amount of unsolicited bulk mail.

44. The computer program product of claim 41, wherein the one or more block lists further contain the query data.

45. The computer program product of claim 32, further comprising instructions for causing said computer system to:

receive a removal request from an email sender; and if the sender is determined to be a legitimate sender of email, placing the sender submitting the removal request on a safe list containing senders who transmit legitimate email.

46. The computer program product of claim 45, wherein the sender is not determined to be a legitimate sender of email, and further comprising a step of placing the sender on the safe list for a predetermined length of time.

\* \* \* \* \*